Nov. 4, 1924.
A. SEIDLER
FIELD CABLE LAYER
Filed Aug. 5, 1918
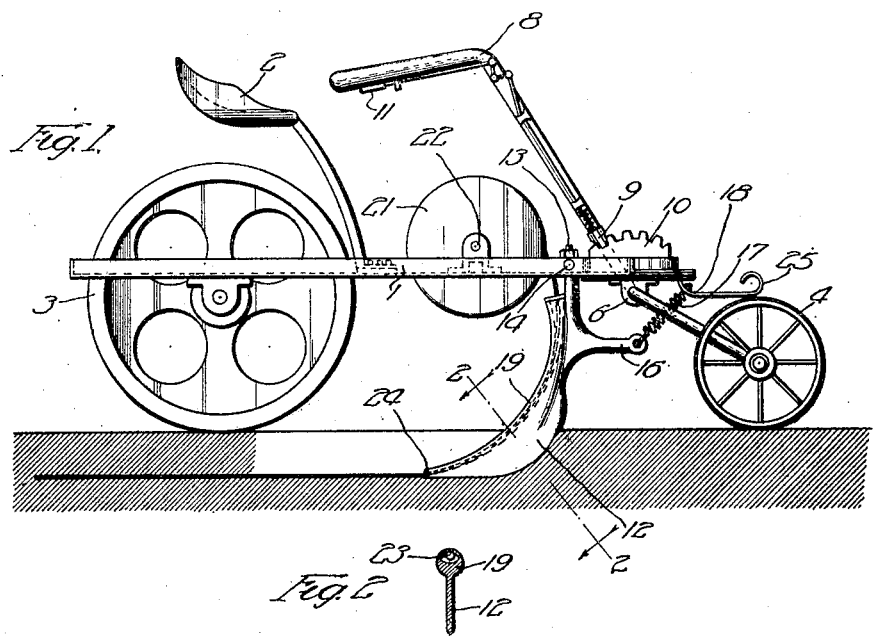
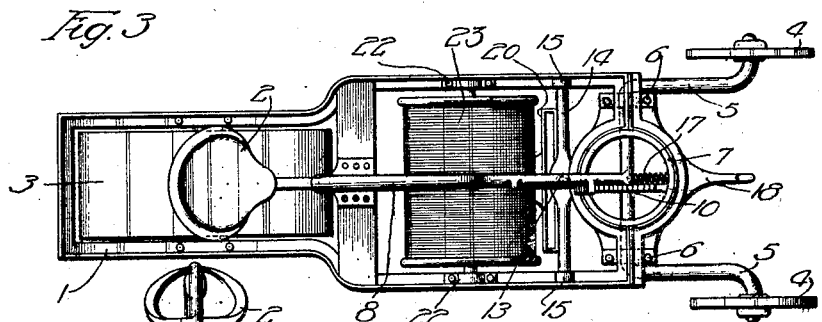
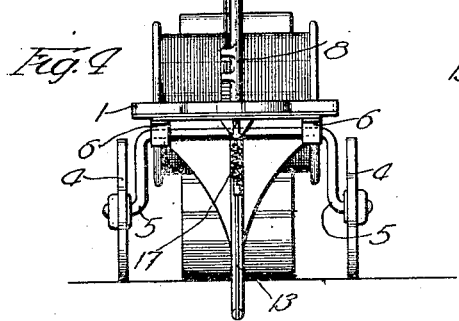
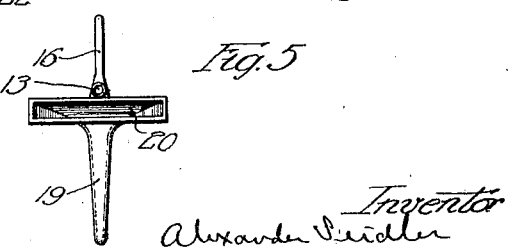
Inventor
Alexander Seidler
By Arthur T. Durward
Atty Patented Nov. 4, 1924.

1,513,937

UNITED STATES PATENT OFFICE.

ALEXANDER SEIDLER, OF CHICAGO, ILLINOIS, ASSIGNOR, BY MESNE ASSIGNMENTS, TO F. C. AUSTIN MACHINERY COMPANY, A CORPORATION OF ILLINOIS.

FIELD CABLE LAYER.

Application filed August 5, 1918. Serial No. 248,294.

*To all whom it may concern:*

Be it known that I, ALEXANDER SEIDLER, a resident of Chicago, Illinois, have invented a certain new and useful Improvement in Field Cable Layers, of which the following is a specification.

This invention relates to machines for laying flexible members, such as a flexible electrical conductor, in the ground, so that work of this kind may be facilitated and carried on quite rapidly.

Special objects are to provide a machine of this kind which will cut a groove and lay the electrical conductor or other flexible member therein, as the machine travels along, and which will force the dirt into the groove to cover the electrical conductor or other member therein, so that the entire work is done by the machine; to provide a machine of this kind which can be steered to the right or the left, and which can be coupled to a tractor; and to provide a construction whereby the depth of the groove cut by the machine may be changed or varied at will.

It is also an object to provide certain details and features of construction and combinations tending to increase the general efficiency and desirability of a machine of this particular character.

To these and other useful ends the invention consists in matters hereinafter set forth and claimed.

In the accompanying drawings—

Fig. 1 is a side elevation of a cable or wire laying machine embodying the principles of the invention.

Fig. 2 is a detail section on line 2—2 in Fig. 1.

Fig. 3 is a plan of the machine shown in Fig. 1.

Fig. 4 is a front end elevation of said machine, on a smaller scale.

Fig. 5 is a plan of the groove cutter and feeding device by which the cable or wire is laid in the ground.

As thus illustrated, the invention comprises a suitable body frame 1 provided with a seat 2 for the operator, and having a single rear wheel in the form of a roller 3, the front steering wheels 4 being mounted on a bale-shaped axle 5, the middle portion of which is arranged to rock in bearings 6 supported by the fifth wheel or turn-table 7 on the front end of the body frame. A hand lever 8 is rigidly connected with the middle portion of the bale-shaped axle 5 and is provided with a locking device 9 to engage the rack or segment 10 on the turn-table or fifth wheel, this rocking device being connected with a handle 11 conveniently mounted on the upper portion of the hand lever 8, and the latter being bent backwardly at its upper end to serve as a steering lever. With this arrangement the angle of the bale-shaped axle 5 can be changed at will, by rocking it in the bearings 6, and this will raise and lower the front end of the body frame.

A groove cutter, consisting of a blade 12 is provided at its upper end with a vertical pivot 13 swivelled in a transverse rock-shaft 14, which latter is mounted in suitable bearings 15 on the body frame of the machine. Said groove cutter is provided with a forwardly extending arm 16 which is connected by a spring 17 with a bracket or arm 18 on the forward end of the body frame, whereby the groove cutter is yieldingly held in operative position. At its rear side the groove cutter is provided with a curved guide 19, which has a transversely elongated or flared mouth 20 at the upper end thereof. A reel 21 is mounted in bearings 22 on the body frame, so that it rotates about a horizontally disposed and transverse axis in rear of the upper end of the groove cutter. The cable or wire 23 to be laid in the ground is wound on said reel and the cable or wire is fed into the mouth 20 of the guide 19 during the operation of the machine.

While the machine is traveling forward, a groove is cut by the groove cutter 12 of the desired depth, and the cable or wire is given a continuous feeding motion through the guide 19 and into the ground, being discharged from the lower and rear end 24 of the groove cutter. In starting, the end portion of the cable or wire can be anchored or held in any suitable manner, and as the machine then travels forward the cable or wire will be laid in the ground and the roller 3 will force the dirt into the groove and thereby cover or imbed the cable or wire in the ground. The depth, as previously explained, can be regulated at will, through the medium of the locking device 9 and the rack or segment 10, so that the cable or wire can be laid at the desired depth in the ground. If the groove cutter strikes a stone or other obstruction, the spring 17 will yield, permittitng the groove cutter to swing backward and slide over the obstruction. If the machine turns to the right or the left, the groove cutter will then turn about its vertical axis or pivot 13, and in this way the groove cutter is adapted for self-adjustment in order to prevent breakage should it strike an obstruction, and in order that it may follow the direction of travel of the machine. While the cable or wire is unwinding, it shifts back and forth in the elongated mouth or slot 20 at the upper end of the guide, so that it may unwind freely from the reel.

The machine may be propelled in any suitable or desired manner. For example, its forward end may be provided with a draft hook 25, on the forward end of the bracket 18, by which the machine may be coupled to the rear end of a tractor.

As shown and described, the invention is employed for the purpose of laying a cable or wire in an open field, wherever such is necessary or desirable. Ordinarily, this is done by hand, when any attempt is made to bury the cables or wires, but to a large extent the electrical conductors are allowed to rest on top of the ground. With the invention shown and described, however, the cable or wire can be laid in the ground at the desired depth, very rapidly, and in an inexpensive manner. It is also obvious that the machine may be used for laying other flexible members in the ground, such as flexible pipes or tubing, or anything else that can be handled in this manner.

What I claim as my invention is:—

1. A cable laying machine, comprising a vehicle frame, steering means for controlling the direction of travel of said frame, a groove cutter depending from the frame and movable under pressure thereon about a plurality of axes to permit it to operate in rough or stony ground, means for directing a cable into the groove formed by said cutter, and means for refilling the groove after the cable is laid therein.

2. A cable laying machine, comprising a vehicle frame, means depending from said frame for cutting a groove and laying a cable therein, storage means for the cable, and means for steering the vehicle to the desired course of travel, said cutting and cable-laying means being mounted with a swivel connection to permit it to follow said steering means in changes of direction of travel.

3. A cable laying machine, comprising a vehicle frame, means for controlling the direction of travel of the machine from an operator's position on the frame, a yieldably mounted groove cutter depending from the frame, a curved cable guide secured to the rear of said groove cutter, said guide having a flared opening at the top, and a storage reel for the cable mounted above said guide and from which the cable is directed through the guide into the ground.

4. In a machine for laying a flexible member under ground, a groove cutter, means to feed the flexible member into the groove behind said groove cutter, and a traveling support for said groove cutter and feeding means, said feeding means comprising a guide on the rear side of said groove cutter, and a reel to feed the flexible member to said guide, the upper end of said guide being flared to form a transverse slot in which the flexible member may shift back and forth while unwinding from said reel.

5. In a machine for laying a wire or other flexible member in the ground, the combination of a body frame, front steering devices adapted for also raising and lowering the front end of said frame, a groove cutter behind the steering devices, means behind the groove cutter to support the body frame and to travel on the groove cut in the ground, a guide on the rear side of said groove cutter, a transverse rocker support on said frame, a vertically disposed pivot on said rocker support for the upper end of said groove cutter, spring means to yieldingly hold the said groove cutter in operative position, and means to supply the wire or other flexible member to the upper end of the said guide.

ALEXANDER SEIDLER.